Nov. 7, 1950              W. HUSY             2,528,957
DEVICE ON AUTOMOTIVE VEHICLES FOR PREVENTING THE
INADVERTENT BACKWARD MOTION OF THE VEHICLE
Filed Feb. 25, 1948                              4 Sheets-Sheet 1

Inventor:
Walter Husy

Nov. 7, 1950 W. HUSY 2,528,957
DEVICE ON AUTOMOTIVE VEHICLES FOR PREVENTING THE
INADVERTENT BACKWARD MOTION OF THE VEHICLE
Filed Feb. 25, 1948 4 Sheets-Sheet 2
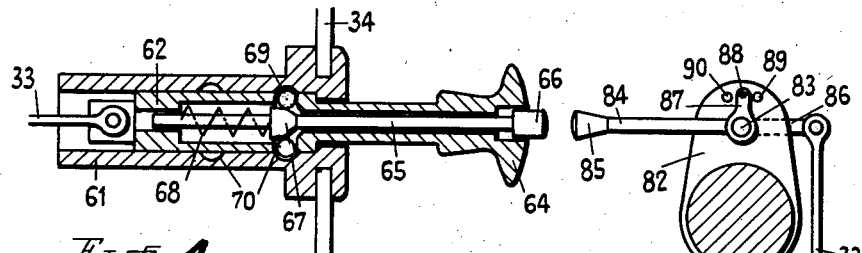
Fig. 4  Fig. 6  Fig. 5
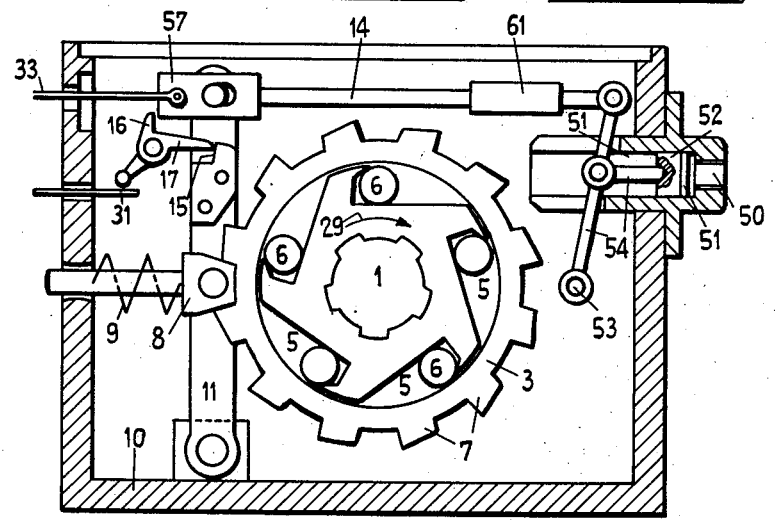
Fig. 7
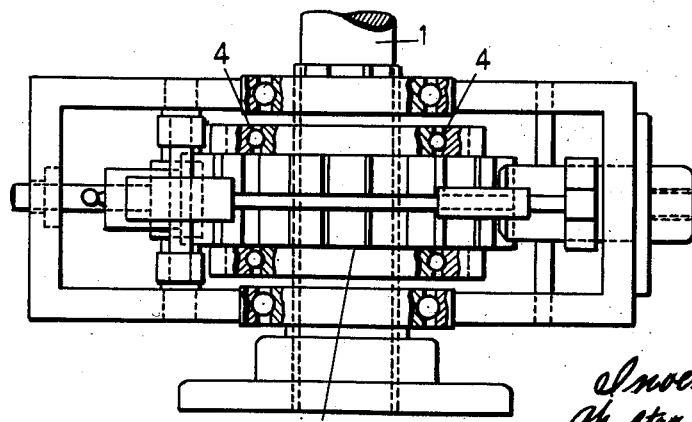
Inventor:
Walter Husy
by E. F. Wenderoth
Atty Patented Nov. 7, 1950

2,528,957

UNITED STATES PATENT OFFICE 2,528,957

DEVICE ON AUTOMOTIVE VEHICLES FOR PREVENTING THE INADVERTENT BACKWARD MOTION OF THE VEHICLE

Walter Husy, Zurich, Switzerland

Application February 25, 1948, Serial No. 10,836
In Switzerland July 3, 1946

4 Claims. (Cl. 192—4)

My present invention relates to a device on automotive vehicles for preventing the inadvertent backward motion of the vehicle.

Quite a number of devices on automotive vehicles have been suggested which are intended to prevent a backward motion of the vehicle which may easily occur when starting uphill. With the conventional automobile this backward motion must be prevented by the driver by use of the hand brake which necessitates the skilful manipulation of hand brake, clutch and throttle lever and may in addition cause damage to the mechanism of the vehicle by stalling the engine as well as by collisions with other road users. Some of the devices suggested are of the type with a pawl and ratchet mechanism, others are a special design of the free-wheel. Pawl and ratchet locks are not only complicated and unwieldy structure because of their multiplicity of parts for which reason alone they are not suitable for automotive vehicles and in particular those used for the conveyance of passengers, but they are also unfavorable with regard to the required possibility of releasing the locked reverse as is necessary when the vehicle is to be reversed intentionally as for example when manoeuvring etc., and they can be ineffective in the no-load condition only. In common with the aforementioned devices the free-wheel constructions also have as their weak point the controlling of the wedging bodies to enable intentional reversing, and in this case too this manipulation can only be carried out when the device is not loaded.

The present invention aims at eliminating the drawbacks described, and it concerns a device in automotive vehicles for preventing the unintentional backward motion of the vehicle in which a lock is located in the train of the transmission from the engine to the driving wheels which permits the reverse gear to be engaged directly without first having to relieve the transmission of the driving load.

The accompanying drawings illustrate schematically various possible embodiments of the invention, whereby only the parts are shown which are necessary for the understanding of the invention, and in which—

Figure 1:
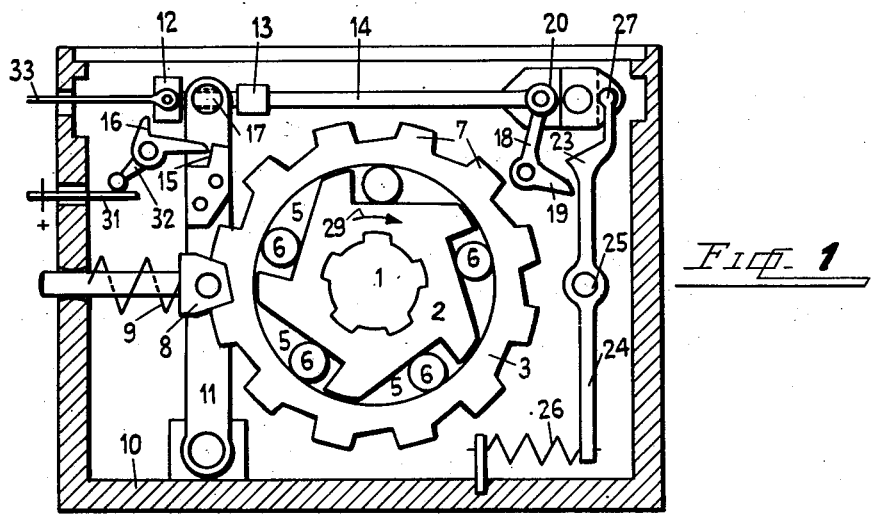
Figure 2:
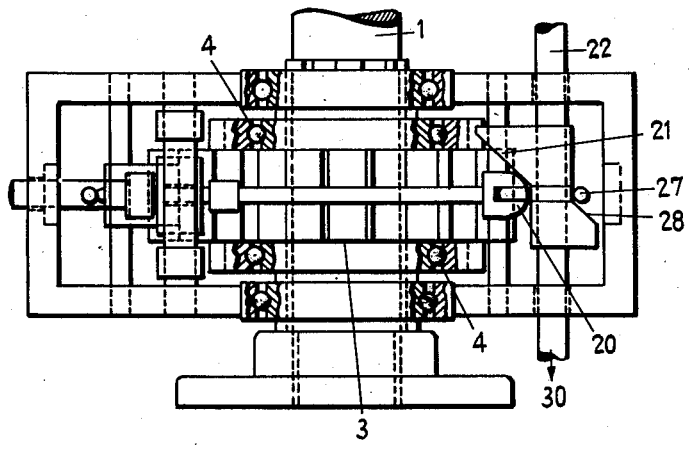
Figure 3:
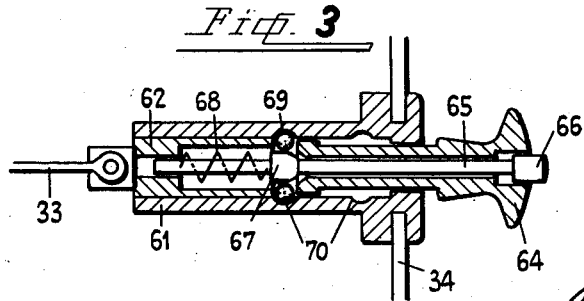

Fig. 1 is an end view of a first example, and
Fig. 2 being a plan view thereof;
Fig. 3 is a detail of the operating mechanism of an embodiment in one position, and
Fig. 4 the same detail in another position;
Fig. 5 is an alternative of the detail according to Figs. 3 and 4.

Figure 8:
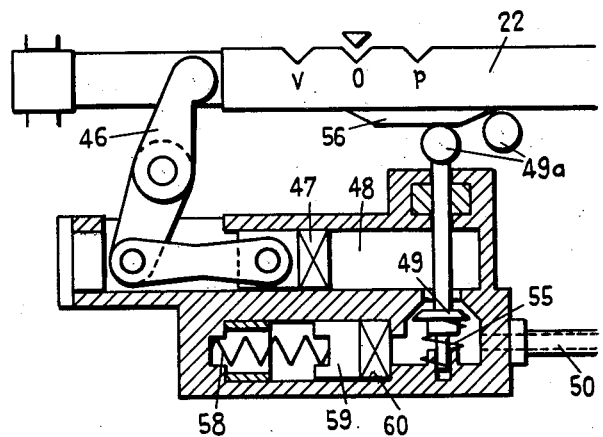
Figure 11:
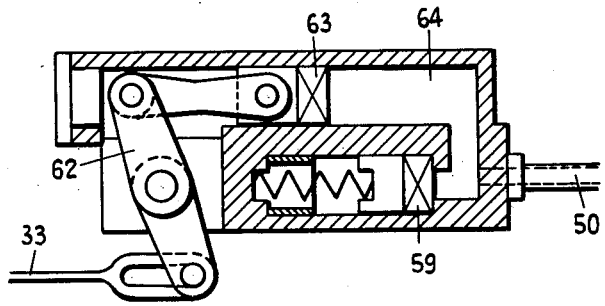
Figure 9:
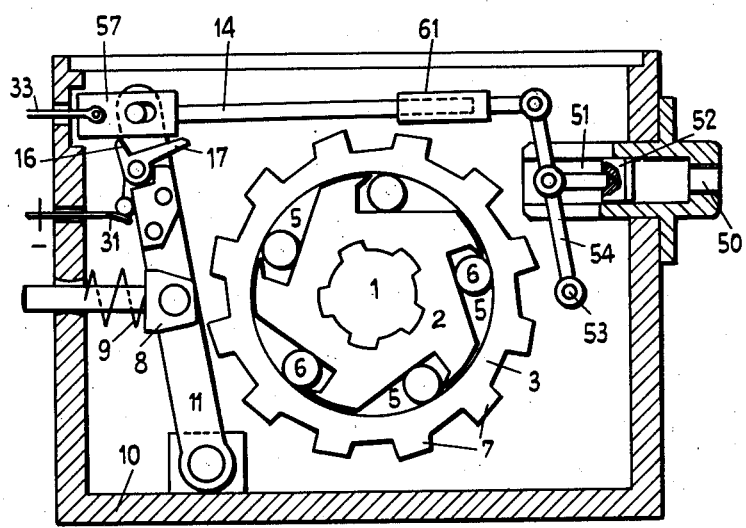
Figure 10:
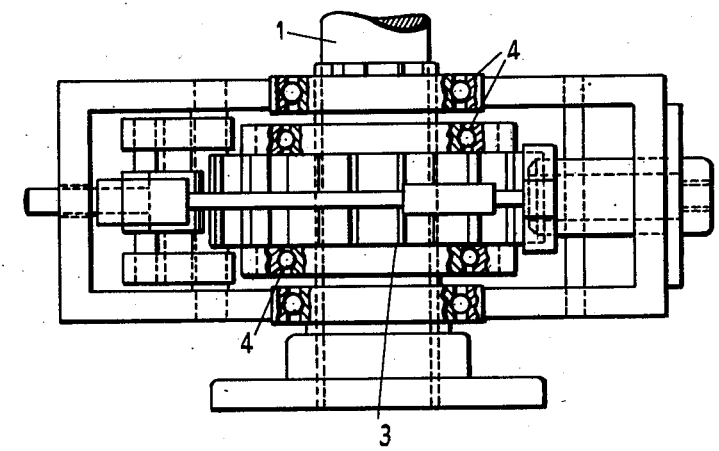

Fig. 6 shows an end view of a second embodiment of the invention,
Fig. 7 being a plan view thereof,
Fig. 8 illustrates in section an alternative detail of the operating mechanism.
Fig. 9 is an end view of a second embodiment to which the alternative detail according to Fig. 6 belongs.
Fig. 10 is a plan view of this embodiment, and
Fig. 11 represents a further detailed alternative of the operating mechanism.

According to the first form of embodiment of the invention 1 is the shaft of a change speed gear of an automotive vehicle e. g., an automobile used for the conveyance of passengers. On this shaft 1 the inner part 2 of a locking device representing the reverse lock is keyed. This inner part 2 is surrounded by an outer part 3 of the locking device representing a roller ring mounted on balls 4. Between parts 2 and 3 chambers 5 circumferentially spaced are formed representing wedging surfaces between the walls of parts 2 and 3 whereby the inner wall of part 3 is circular while part 2 has flat surfaces extending tangentially. In each of the chambers 5 there is a roller 6.

The roller ring 3 has dogs 7 on its outer surface which are evenly spaced on the circumference of the ring and cooperate with a locking dog 8. The locking dog 8 is subjected to the action of a pressure spring 9, which bears on said dog and the wall of a housing 10 surrounding the locking device, and is pivoted to a lever 11 which is rotatably mounted on the floor of the housing 10. The lever 11 extends with a clearance between the stops 12, 13 which are mounted on a push rod 14, and it has a shoulder 15. In the housing 10 a bell crank 16, 17 is pivotally mounted whose arm 16 cooperates with stop 12 of the push rod and whose arm 17 cooperates with shoulder 15 of lever 11, and this bell crank forms a lock for the locking dog 8 in one of the dogs 7 of the roller ring.

The push rod 14 is pivoted to the end of arm 18 of a bell crank 18, 19 and its head 20 formed at this pivot cooperates with a cam 21 of the shift rod 22 of the reverse gear of the change speed gear of an automobile. The arm 19 of bell crank 18, 19 cooperates with shoulder 23 of a lever 24 which is pivoted to the housing 10 at 25 and presses with one end 27 against a second cam 28 of the shift rod 22 under the action of a spring 26.

When the reverse gear is not in action the parts described are in the position shown in Figs.

1 and 2, i. e. the shift rod 14 is located to the right and its head 20 rests at the bottom of cam 21. The locking dog 8 meshes under pressure of spring 9 between two dogs 7 of the roller ring 3, thus locking the latter against rotation, and the bell crank 16, 17 locks the lever 11 in the locking position of the dog 8 by means of the arm 17 and the shoulder 15 thus securing the locking of the roller ring 3. The arm 19 representing together with shoulder 23 and lever 24 a locking arrangement is out of engagement with shoulder 23, and the end 27 of lever 24 rests against the bottom of cam 28.

In this position of the various parts the rollers 6 are free to rotate in the chambers 5 when the vehicle moves in a forward direction whereby the inner part 2 of the locking device rotating together with shaft 1 in the direction of arrow 29 moves the rollers 6 towards the sections of the chambers 5 where the walls of 2 and 3 are a greater distance apart than is represented by the diameter of the rollers 6. Should the vehicle tend to roll backwards the rollers 6 in the chambers 5 are rolled into the narrowing of the wedging surfaces formed by bounding walls of 2 and 3 by the reversal of the direction of rotation of shaft 1 and are wedged there securely engaging shaft 1 with the roller ring 3 to form a solid whole to prevent the backward motion of the vehicle.

If it is desired to drive backwards intentionally i. e. if the reverse gear of the motor car is engaged, then the shift rod 22 being shifted in the direction of the arrow 30 (Fig. 2) moves the push rod 14 to the left by the shifting action of the cam 21 on its head 20. Thereby, in the first place, the stop 12 comes up against the arm 16 of the bell crank 16, 17 to lift arm 17 out of the way of shoulder 15 thus releasing the lock of locking dog 8. Then stop 13 comes up against lever 11 and moves it against the pressure of spring 9 thus pushing locking dog 8 out of engagement with the dogs 7 and allowing roller ring 3 to rotate freely, i. e. the outer part of the locking device together with its inner part, in the opposite direction to arrow 29.

In moving push rod 14 to the left arm 19 comes to lie on shoulder 23 by the spring urged movement of lever 24 and is locked in that position inasmuch as the operation of engaging the reverse gear has no effect on this lever 24.

As long as the reverse gear is engaged this lock at 19, 23 remains effective and with it the possibility of reversing the motor car. When disengaging the reverse gear this lock remains effective until, after the gear wheels of this gear have come out of mesh, the end 27 of lever 24 rises slightly on the cam path 28 in the last phase of the movement of shift rod 28. By this means lever 24 is pivoted against the pressure of spring 26 and shoulder 23 is lifted off arm 19, i. e. the lock of locking dog 8 in the position in which it has not effect of roller ring 3 is eliminated and push rod 14 as well as lever 11 with locking dog 8 return to their original position and locking dog 8 again comes into engagement between two dogs 7 of roller ring 3 thus locking it again. This lock in its turn is again secured in its original position by the locking bell crank 16, 17.

When engaging the forward gear associated with the reverse gear the shift rod 22 has to be given a slight backward movement in the direction of arrow 30 after completing the disengaging movement so that shoulder 23 moves into the position ready for re-engagement with arm 19 for which purpose a spring can be provided which is slightly compressed by the disengaging movement of 22 and gives rod 22 the small reverse motion required when the gear shift lever is released.

To show the driver the working position of the locking device an indicating device can be provided on the instrument panel of the motor car which may take the form of a colored signaling lamp. In the current circuit of this lamp there might be a contact the blade 31 of which projects into the path of motion of a third arm 32 on locking lever 16, 17. If the lock formed by the locking elements 2, 3 is in action the arm 32 is out of reach of contact arm 31 and the switch is open and therefore the lamp switched off. If, however, the lock is made inoperative arm 32 presses on contact 31 through the pivoting motion of bell crank 16, 17 caused by stop 12 and closes the switch of the lamp thus causing it to light up.

In addition provision can be made that the locking device can be cut out by the driver at his free will and independently of the engagement of the reverse gear of the motor car. For this purpose a cable pull 33 engaging push rod 14 may be provided to the other end of which is attached an operating means located on the instrument panel 34 or the steering column.

Figs. 3 and 4 show such an operating means. In a cylinder 61 a movable plunger structure is slidably arranged the extension of which ends in a handgrip 64 protruding through the instrument panel 34. To the other end the draw cable 33 is attached. Inside of this part a rod 65 is fitted which ends in a push button 66 projecting out of the handgrip 64. Halfway along this rod there is a taper-shaped enlargement 67 as a locking means in respect of the two roller members 68 and at the same time serving as an abutment for the compression spring 68. The roller members 69 penetrate the plunger structure 62 and rest in recesses 70 in the cylinder 61. The roller members 69 spaced apart by the tapered enlargement 67 make a displacement of the plunger structure 62 in cylinder 61 impossible. By pressing in the push button 66 the spacing piece 67 is displaced sufficiently to allow the roller members to drop out of the recesses 70; then the plunger structure on hand-grip 64 can be shifted to the next notch into which the roller members are guided by the pressure caused by the wedge action of the spacing piece 67. Fig. 4 shows the cable pull in the drawn position.

In place of the cable pull fixed to the instrument panel (according to Figs. 3 and 4) the draw cable 33 may be operated a lever mounted pivotally to the steering column, as shown in Fig. 5, and arranged as follows: To the steering column 81 a plate 82 is affixed in which a shaft 83 is pivotally mounted. On the upper end of this shaft there is a lever 84 with grip 85. At the lower end of shaft 83, which extends downward to the floor-board of the vehicle there is a lever 86 to which the cable pull 33 is attached. In addition of plate 87 having a spring action is securely pinned to the top end of shaft 83 and in this plate a stud 88 is inserted. In plate 82 two openings 89 and 90 are provided which serve as notches for stud 88. In the lever position according to notch 89 the locking device is engaged, and in the the position 90 it is disengaged.

Instead of operating the locking device mechanically as described it might also be done by pressure means. Such an embodiment is shown in Figs. 6–10.

In this case the shift rod 22 (Fig. 8) is linked to piston 47 of a cylinder space 48 by means of a lever 46 and this cylinder space is connected through a valve 49 to a pipe line 50 said pipe line leading to a cylinder space 51 on the locking device. In this second cylinder space 51 a piston 52 is displaceably provided said piston being connected to push rod 14 through a lever 54 pivotally mounted in housing 10 at 53. Valve 49 is pressed against a cam 56 on the shift rod 22 with a head 49a, by means of a spring 55.

If the reverse gear is engaged, i. e. if the shift rod 22 is pushed to the left from its normal position O (Fig. 8), lever 46 moves piston 47 to the right in the cylinder space 48, i. e. the cylinder space 48 is reduced and some of the pressure means, which may be oil, is displaced through valve 49 and pipe line 50, into the cylinder space 51. Thereby piston 52 in this cylinder space is moved outwardly in this cylinder space and it pushes the push rod 14 to the left causing an abutment piece 57 of this push rod 14 to disengage bell crank 16, 17 from shoulder 15 and the lever 11 to withdraw the locking dog 8 from the roller ring 3.

The amount of oil displaced by this movement is so chosen that on completion of the engagement of the reverse gear the locking dog 8 is fully withdrawn, and that in addition a spring 58 back of a piston 59 in a cylinder space 60 communicating with pipe line 50 has received a certain tension to act as an elastic intermediary means. Valve 49 prevents the reflux of the oil being released by cam 56 on engaging the reverse gear and being closed by spring 55 (shown by dotted lines in Fig. 8). On disengaging reverse gear valve 49 is again opened by cam 56 so that by means of spring 9 the former pressure condition is again restored and the back motion locking device comes into action again.

In this case too the putting out of operation of the locking device from the driver's seat of vehicle can be applied by means of a cable pull 33 whereby, as shown in Fig. 6, the cable pull 33 is attached to push rod 14 at the abutment 57 and a sliding sleeve 61 is inserted in the push rod 14 which sleeve allows the push rod 14 to be drawn out by cable pull 33 without affecting the pressure side.

As shown in Fig. 11 the cable pull 33 might act directly on the pressure means by acting through a lever 62 on a piston 63 in a cylinder space 64 connected to the pipe line 50 leading to the operating piston of the locking dog. Here too a damping piston 59 could be provided.

The safety means against a premature engagement of the locking dog with the dog-toothed rim is provided by the special shaping of the dogs inasmuch as their unilateral superelevation prevents the locking dog from coming into engagement as long as the dog-toothed ring is moving (reverse driving direction). The root of the dog teeth as well as the tip of the dog teeth can have unequal heights of the flanks. Due to this safety means a premature engagement of the locking dog with the gear shaft is impossible and therefore damage to the power transmission elements is eliminated with certainty. On the other hand the same superelevation has the effect that when driving ahead the engagement is brought about automatically by the locking dog knocking against the dogs of the ring. Because of the exactly determined difference of height of the flanks the function is also assured that the engagement of the locking dog with the dog-toothed ring takes place at the moment the vehicle comes to rest.

Concerning the certainty of the engagement of the locking dog with the dog-toothed ring this is assured by the correct functioning of the bell crank 16, 17.

The inner part of the locking element forming the locking device can have the walls forming part of the chambers variously shaped to form the complete chambers. Thus the front parts of the walling can have a wedge-shaped overlap which caused a lifting-off of the rollers 6 from the outer locking element, the roller ring whenever the rollers are being pushed. The wedging surfaces can also have a curved shape. Instead of being fitted to a gear box of an automobile the locking device could also be located in some other position in the train of the drive from the engine to the driving wheels of the vehicle as for example near the differential gear in which case it might be built together with the housing of the differential gear.

The device according to the invention allows above all to make the locking device inoperative without having to relieve it of its load preliminarily. This not only simplifies the manipulation of the device but it also gives a great certainty in traffic as well as in the action of the device and in addition its parts are not subjected to breakage and wear and tear. Furthermore the locking means in the locking device act equally concentrically thus no one-sided radially acting shock stresses can occur.

What I claim and desire to secure by Letters Patent is:

1. A device for preventing unintentional backward motion of a vehicle comprising a locking device arranged in the transmission of the vehicle and comprising an inner member rigidly fixed to a drive shaft in said transmission, a roller ring rotatably mounted around said inner member having an inner circular wall said inner member having irregular shaped teeth thereon and forming with said inner circular wall of said ring a plurality of circumferentially spaced wedge shaped spaces, a roller in each said space, each said space varying in width from substantially zero to a width greater than the diameter of said rollers, a plurality of teeth in the outer surface of said roller ring, a spring pressed locking dog for engagement with said teeth on said roller ring and normally locking said roller ring from rotation, release means for said dog operatively connected to a gear shaft mechanism of said transmission and operating to release said dog when the transmission is placed in a reverse position, said inner member being free to rotate in said roller ring in one direction of travel of the vehicle when said dog is engaged but being braked by said rollers acting in said wedge shaped spaces when said vehicle travels in the opposite direction, said roller ring being free to rotate with said inner member when said dog is released by said release means upon reversing said transmission, latching means for said dog comprising a lever rotatably mounted and connected to said dog, an abutment on said lever, a pivotally mounted bell crank having an arm thereof for engagement with said abutment, a push rod having two stops thereon, said lever extending between said two stops, a second arm on said bell-crank being actuatable by one said stop to release said first arm from said abutment and said lever being movable by the other of said stops to release said dog from said roller ring.

2. A device as claimed in claim 1, a double surface cam secured to the reverse shift rod of said transmission, a lever having a shoulder thereon pivotally mounted in the housing of said device, an end of said lever pressing against one said cam surface, the opposite end of said lever being spring connected to said device, a second bell crank pivotally mounted, an end of said push rod being pivotally connected to the end of an arm of said second bell crank, the said end of said push rod contacting a second of said cam surfaces, a second of said arms of said second bell crank cooperating with said shoulder on said lever, said shoulder and the bell crank arm cooperating therewith constituting a lock for holding said push rod in a position to disengage said dog from said roller ring when the transmission is in reverse position, said cam surfaces actuating said push rod when said shift rod is moved in one direction, and said lever to disengage said shoulder and said crank when moved in an opposite direction.

3. A device as claimed in claim 2, said means comprising a cable pull, said cable pull being connected to said push rod for actuation thereof to disengage said dog from said roller ring, wedging means for holding said cable in a predetermined position, and means for releasing said wedging means.

4. A device for preventing unintentional backward motion of a vehicle comprising a locking device arranged in the transmission of the vehicle and comprising an inner member rigidly fixed to a drive shaft in said transmission, a roller ring rotatably mounted around said inner member having an inner circular wall said inner member having irregular shaped teeth thereon and forming with said inner circular wall of said ring a plurality of circumferentially spaced wedge shaped spaces, a roller in each said space, each said space varying in width from substantially zero to a width greater than the diameter of said rollers, a plurality of teeth in the outer surface of said roller ring, a spring pressed locking dog for engagement with said teeth on said roller ring and normally locking said roller ring from rotation, release means for said dog operatively connected to a gear shaft mechanism of said transmission and operating to release said dog when the transmission is placed in a reverse position, said inner member being free to rotate in said roller ring in one direction of travel of the vehicle when said dog is engaged but being braked by said rollers acting in said wedge shaped spaces when said vehicle travels in the opposite direction, said roller ring being free to rotate with said inner member when said dog is released by said release means upon reversing said transmission, said means for releasing said dog from said roller ring comprising a push rod, a lever operatively connected to said dog, said push rod being operatively connected to said lever for moving the same, a first cylinder, a piston displaceable therein, means connected to gear shift means for said transmission to move said piston in said cylinder, a second cylinder in said device, a pipe connecting both said cylinders, a piston in said second cylinder, a lever pivotally mounted in said device at one end thereof, said piston in said second cylinder being connected to said lever, the free end of said lever being connected to said push rod whereby upon actuation of said gear shift mechanism said push rod will be actuated to release said dog from said roller ring by transfer of pressure from said first cylinder to said second cylinder.

WALTER HUSY.

REFERENCES CITED

The following references are of record in the file of this patent:

UNITED STATES PATENTS

| Number | Name | Date |
| --- | --- | --- |
| 1,149,779 | Orelle | Aug. 10, 1915 |
| 1,153,265 | Smith | Sept. 14, 1915 |
| 1,184,567 | Poorman | May 23, 1916 |
| 1,864,142 | Meyer | June 21, 1932 |
| 1,971,655 | Movier | Aug. 28, 1934 |
| 1,977,588 | Matson | Oct. 16, 1934 |
| 1,995,936 | Matson | Mar. 26, 1935 |